(12) United States Patent
Huberman et al.

(10) Patent No.: US 8,589,292 B1
(45) Date of Patent: Nov. 19, 2013

(54) CREATING A MARKET FOR UNBIASED PRIVATE INDIVIDUAL DATA

(75) Inventors: Bernardo Huberman, Palo Alto, CA (US); Christina Aperjis, San Francisco, CA (US)

(73) Assignee: Hewlett-Packaqrd Company, L. P., Houston, TX (US)

( * ) Notice: Subject to any disclaimer, the term of this patent is extended or adjusted under 35 U.S.C. 154(b) by 0 days.

(21) Appl. No.: 13/597,516

(22) Filed: Aug. 29, 2012

(51) Int. Cl.
*G06Q 40/00* (2012.01)

(52) U.S. Cl.
USPC ............... 705/39; 705/36 R; 705/37; 705/27; 705/67; 726/1

(58) Field of Classification Search
USPC ............... 705/27, 37, 10, 39, 36 R, 67; 726/1
See application file for complete search history.

(56) References Cited

U.S. PATENT DOCUMENTS

| | | | |
|---|---|---|---|
| 6,801,903 B2 * | 10/2004 | Brown et al. ........................ | 1/1 |
| 7,630,986 B1 * | 12/2009 | Herz et al. ............................ | 1/1 |
| 8,140,384 B2 | 3/2012 | Almeida | |
| 2003/0014349 A1 * | 1/2003 | Guler et al. ...................... | 705/37 |
| 2009/0138380 A1 * | 5/2009 | Roseman et al. ................ | 705/27 |
| 2010/0036713 A1 * | 2/2010 | Tang ................................ | 705/10 |
| 2011/0106560 A1 * | 5/2011 | Eaton, Jr. et al. ................. | 705/3 |
| 2011/0196776 A1 | 8/2011 | Rash et al. | |
| 2011/0270666 A1 | 11/2011 | Welsh et al. | |

OTHER PUBLICATIONS

Predicting housing value: a comparison of multiple regression analysis and artificial neural networks Nguyen, Nghiep ; Cripps, Al. The Journal of Real Estate Research 22.3 (Nov./Dec. 2001): 313-336.*
Palgrave MacMillan—Inequality in the utility of customer data: Implications for data management and usage Even, Adir; Shankaranarayanan, G ; Berger, Paul D . Journal of Database Marketing & Customer Strategy Management 17.1 (Mar. 2010): 19-35.*
Gopal et al~"Electronic Markets for Private Information: Economic and Security Considerations"~Proc 39th Hawaii Int'l Conf on System Sciences~2006~8 pages.
Yassine et al~"Privacy and the Market for Private Data: A Negotiation Model to Capitalize on Private Data" DISCOVER Lab~University of Ottawa~10 pages~2008.

* cited by examiner

*Primary Examiner* — Harish T Dass (57) ABSTRACT

A market for unbiased private individual data is disclosed. A data market maker managing the market collects information from owners of private individual data on their privacy and risk attitudes. The collected information includes choices from the owners of private individual data on different pricing schemes that reflect the privacy and risk attitudes of the owners of data. The data market maker receives requests for access to private individual data from data buyers over time and determines pricing menus listing prices for the data buyers to pay for access to the private individual data based on the collected information. The data market maker compensates the owners of the private individual data for selling access to their data to the data buyers.

20 Claims, 9 Drawing Sheets

CREATING A MARKET FOR UNBIASED PRIVATE INDIVIDUAL DATA

BACKGROUND

The proliferation of the Internet has facilitated the sharing and distribution of content and data like never before. Users now flock to websites, search engines, and social networks to access and share content and data. The amount of data available is estimated to be on the order of millions of terabytes. Along with this data comes an unprecedented opportunity to explore it for business purposes as well as a responsibility and need to respect the privacy of users.

User data may be explored and analyzed for marketing purposes (e.g., targeted advertising), tagging services (e.g., visual tagging), location-based services (e.g., location-based recommendations), and business forecasting (e.g., budget forecasting), among others. The user data may be collected and analyzed by a number of data aggregation, data mining and analytics tools. These tools may be embedded directly into the web sites, search engines, and social networks where the users are sharing their data.

A common theme among these data aggregation, data mining and analytics tools is that user data may be collected and traded by multiple business parties at a profit without the knowledge, consent, and proper compensation of the users.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A market for unbiased private individual data is disclosed. The market is managed by a data market maker that facilitates interactions between those interested in buying access to unbiased samples of private individual data (i.e., data buyers) and the individuals to whom the data correspond (i.e., data sellers or owners of the individual data). As generally referred to herein, unbiased individual data are individual data that are representative of the individuals and their behavior, characteristics, and attitudes. The private individual data can be any data pertaining to an individual, such as, for example, data generated by a hospital about its patients, data that a cable provider has about the viewing habits of its customers, data generated through a credit card transaction, data generated through an online activity, and so on.

In various examples, the private individual data is stored in one or multiple databases. The data buyers do not have the right to access the private individual data and the data sellers are interested in granting access to their data if properly compensated. The data market maker receives a request for private individual data from a data buyer, collects information on the privacy and risk attitudes of the data sellers towards their data, and determines a pricing menu for unbiased samples of private individual data that, upon purchase, can be used by the data buyer for any legitimate purpose.

As described in more detail herein below, the data market maker collects information on the privacy and risk attitudes of the data sellers by asking the data sellers to choose between different pricing schemes for allowing data buyers access to their data. When a request for data from a potential data buyer arises, the data market maker determines a pricing menu for the request based on the pricing choices selected by the data sellers. The pricing menu lists a set of prices for a set of data sample sizes. The data buyer selects a sample size and is granted access to a sample of unbiased private individual data in exchange for its price as listed in the pricing menu. The data market maker uses the data buyer's payment to appropriately compensate the data sellers according to their choice of pricing schemes, while keeping a portion of the payment for its data market maker services.

It is appreciated that, in the following description, numerous specific details are set forth to provide a thorough understanding of various examples. However, it is appreciated that the examples may be practiced without limitation to these specific details. In other instances, well known methods and structures may not be described in detail to avoid unnecessarily obscuring the description of the examples. Also, the examples may be used in combination with each other.

Figure 1:
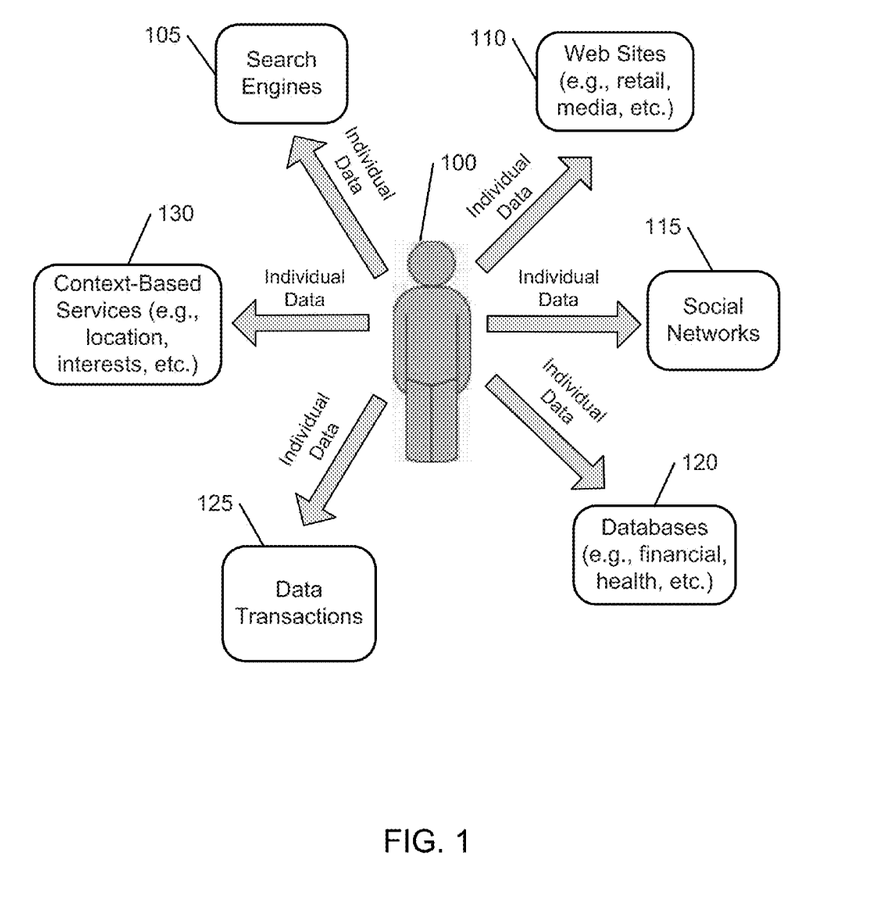
FIG. 1 illustrates a schematic diagram of an individual sharing data in accordance with various examples.

Referring now to FIG. 1, a schematic diagram of an individual sharing data in accordance with various examples is described. Individual 100 may be an individual having access to a network (e.g., the Internet) and multiple devices (e.g., personal computers, laptops, mobile devices, video gaming units, etc.) for sharing content and data. Individual 100 may also be an individual sharing content and data with others using offline ways, such as, for example, by filling out forms (e.g., at a doctor's office, bank, etc.) or responding to surveys (e.g., by phone or in person). The data may include both public and private individual data that the individual voluntarily divulges offline or online via an online activity or that can be accessed or inferred from the individual's presence or interactions offline or online.

For example, the individual 100 may visit search engines 105 to perform search queries for information, products, people, and so on. Every time the individual 100 performs a search query, the individual 100 is voluntarily sharing search query keywords with the search engines 105. These search query keywords may be stored by the search engines 105 to collect information about the individual 100 and his/her querying interests and behavior. Similarly, the individual 100 may visit web sites 110 and social networks 115 to search and share content and data. The web sites 110 may include, for example, retail web sites where the individual 100 may find and purchase products, media web sites where the individual 100 may access information, blogs where the individual 100 may share content and data, and other informational and business web sites, among others. The social networks 115 allow the individual 100 to share content and information with his/her social network connections (e.g., friends). Every time the individual 100 interacts with the web sites 110 (e.g., by clicking on links in the web sites 110) or the social networks 115 (e.g., by posting information to friends), the individual 100 is sharing data that may be used to characterize the individual 100 interests and behavior.

The individual 100 may also have his/her data stored in databases 120, such as for example, financial databases, health records databases, customer profile databases, and so on. These databases 120 may be private databases where access to data is granted upon user authentication (e.g., via a username and password). In another example, the individual 100 may also have its data shared when participating in data transactions 125 (e.g., credit card payments), be it online or not—Further, the individual 100 may share data when interacting with context-based services 130, such as, for example, location-based services in mobile devices.

It is appreciated that the individual 100 may also share his/her data in other ways not depicted in FIG. 1. All these examples serve to illustrate that anytime an individual 100 engages in an online or offline activity, the individual 100 may be knowingly or unknowingly sharing data with others. The individual 100 may be willing to share his/her data for free in certain cases (e.g., sharing photos with friends) but may not necessarily be willing to give out his/her data for free to be used by third parties at a profit.

As described in more detail herein below, a data market maker creates and manages a market between those interested in buying access to unbiased samples of private individual data (i.e., data buyers) and the individuals to whom the data correspond (i.e., data sellers or owners of the private individual data). The market enables individuals (e.g., individual 100) to be properly compensated for their data accessed and used by third parties for business and other purposes. The data market maker determines a price for the data that is based on the privacy and risk attitudes of the individuals owning the data.

It is appreciated that in a number of settings, it is of the utmost importance for the buyer of the data to obtain an unbiased sample of individual data from individuals with certain characteristics; otherwise the results of any data analysis the buyer is interested in conducting may not be credible. This is usually the case, for example, with social, educational, marketing, and biomedical studies, among others. For instance, a pharmaceutical company may be interested in obtaining an unbiased sample of a certain demographic that has a certain disease and use a given drug.

Figure 2:
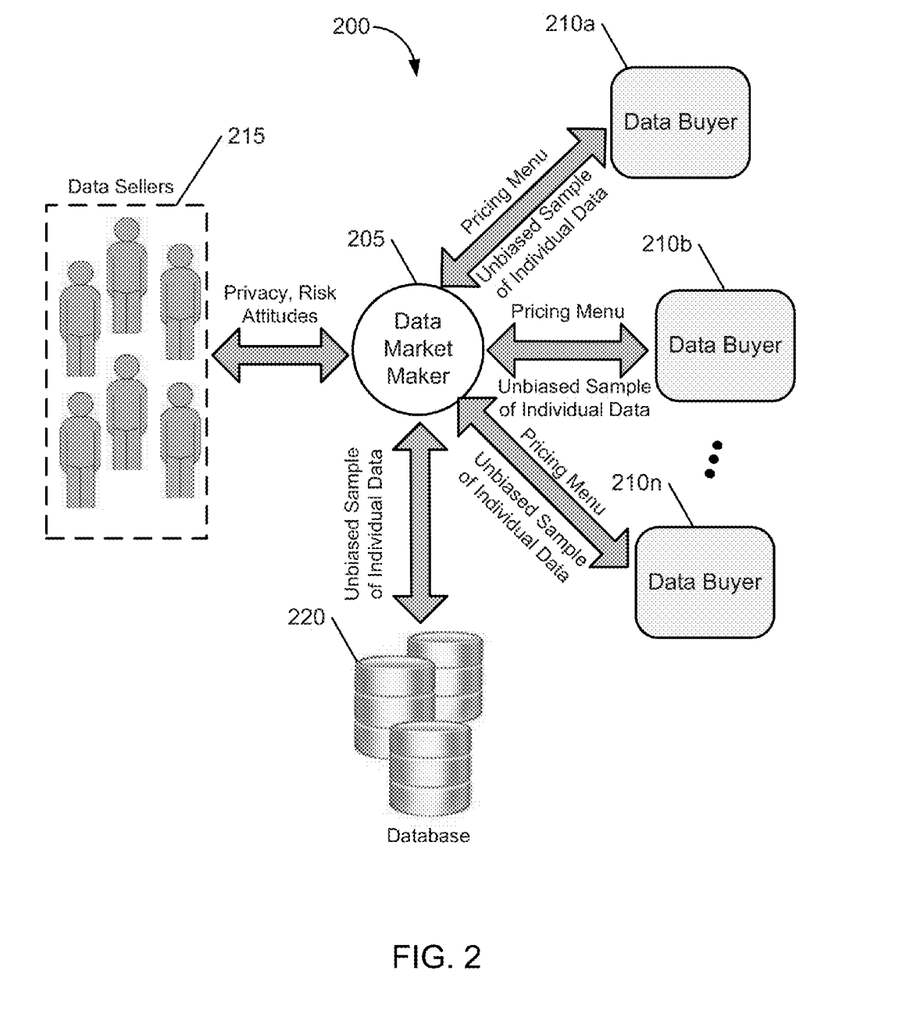
FIG. 2 illustrates a schematic diagram of a market for unbiased private individual data.

Referring now to FIG. 2, a schematic diagram of a market for unbiased private individual data is described. Market 200 is managed by data market maker 205. Data market maker 205 facilitates interactions between those interested in buying access to unbiased samples of private individual data (i.e., data buyers 210a-n) and the individuals to whom the data correspond (i.e., data sellers or owners of the individual data 215). The individual data is assumed to be stored in one or multiple databases 220. The data buyers 210a-n do not have the right to access the private individual data in databases 220 and the data sellers 215 are interested in granting access to their data if properly compensated.

Each data buyer 210 may be interested in a different unbiased sample of private individual data. For example, data buyer 210a may be interested in private individual data stored in a medical records databases, data buyer 210b may be interested in private individual data for a given geographical location, and so on. Each data buyer 210a-n may have multiple requests for unbiased samples of private individual data over time. It is appreciated that a single data buyer may be referred to herein as data buyer 210 (e.g., data buyer 210a, data buyer 210b, . . . , and data buyer 210n).

The data market maker 205 enables the data sellers 215 to be compensated for use of the data by the data buyers 210a-n while taking into account the privacy and risk attitudes of the data sellers 215. As described in more detail herein below, the data market maker 205 determines a set of prices for unbiased samples of private individual data (with the prices varying with the sample size) in such a way that the data sellers 215 are not overly compensated for their data and the data buyers 210a-n are not overly charged for it.

It is appreciated that different individuals such as data sellers 215 have different privacy valuations. For instance, some data sellers 215 may not at all be concerned about privacy and would allow the data buyers 210a-n access to their data in exchange for a few cents, whereas others may only consent if paid at least $10 for each data point. Since all data sellers 215 would inherently prefer to be paid more, even those unconcerned about their privacy may pretend that they are if they expect that this will result in getting higher payments.

On the other hand, the data buyers 210a-n are interested in obtaining unbiased samples of private individual data without having to pay too much for it. Confronted with this problem, the data buyers 210a-n may be tempted to buy access to the private individual data stored in databases 220 with the smallest announced privacy valuations along the lines of a reverse auction. However, this would not provide the data buyers 210a-n with an unbiased sample because the value of an attribute is often correlated with its corresponding privacy valuation. The requirement of an unbiased sample implies the selection of data sellers 215 with the same probability (independently of how much they value their privacy), which can significantly complicate the pricing problem.

In order to solve these problems, the data market maker 205 prices the unbiased samples of private individual data in a way that brings benefits to both the data sellers 215 and the data buyers 210a-n. The data sellers 215 are compensated according to their privacy and risk attitudes so that the data buyers 210a-n pay less than they would if they compensated all data sellers 215 with the same maximum fee that the most concerned about their privacy expect. As appreciated, taking into account the privacy and risk attitudes of the data sellers 215 allows the data market maker 205 to price the data less for the data buyers 210a-n since a significant fraction of data sellers 215 may exhibit risk-averse behavior.

Figure 3:
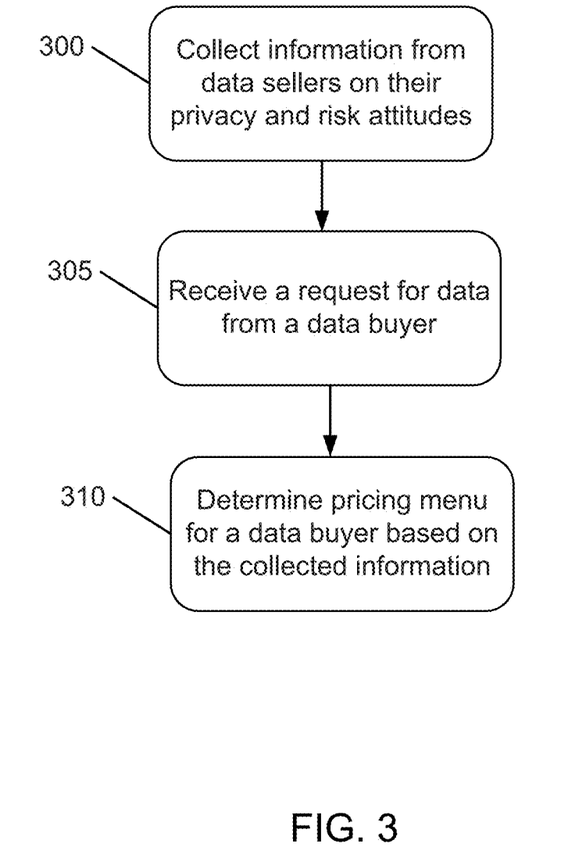
FIG. 3 illustrates a flowchart for a data market maker to manage a market for unbiased private individual data.

Attention is now directed to FIG. 3, which illustrates a flowchart for a data market maker to manage a market for unbiased private individual data. First, the data market maker 205 collects information from the data sellers 215 on their privacy and risk attitudes towards their data (300). In particular, the data market maker 205 collects information with respect to what pricing schemes the data sellers 215 prefer for allowing data buyers 210a-n to access their data. Different sellers may select different pricing schemes depending on their risk and privacy attitudes. The data market maker 205 then receives a request for an unbiased sample of private individual data from a data buyer 210a-n (305). Lastly, the data marker maker 205 determines a pricing menu for unbiased samples of private individual data that, upon purchase, can be used by the data buyer for any legitimate purpose (310). The pricing menu is determined based on the information collected from the data sellers 215.

Figure 4:
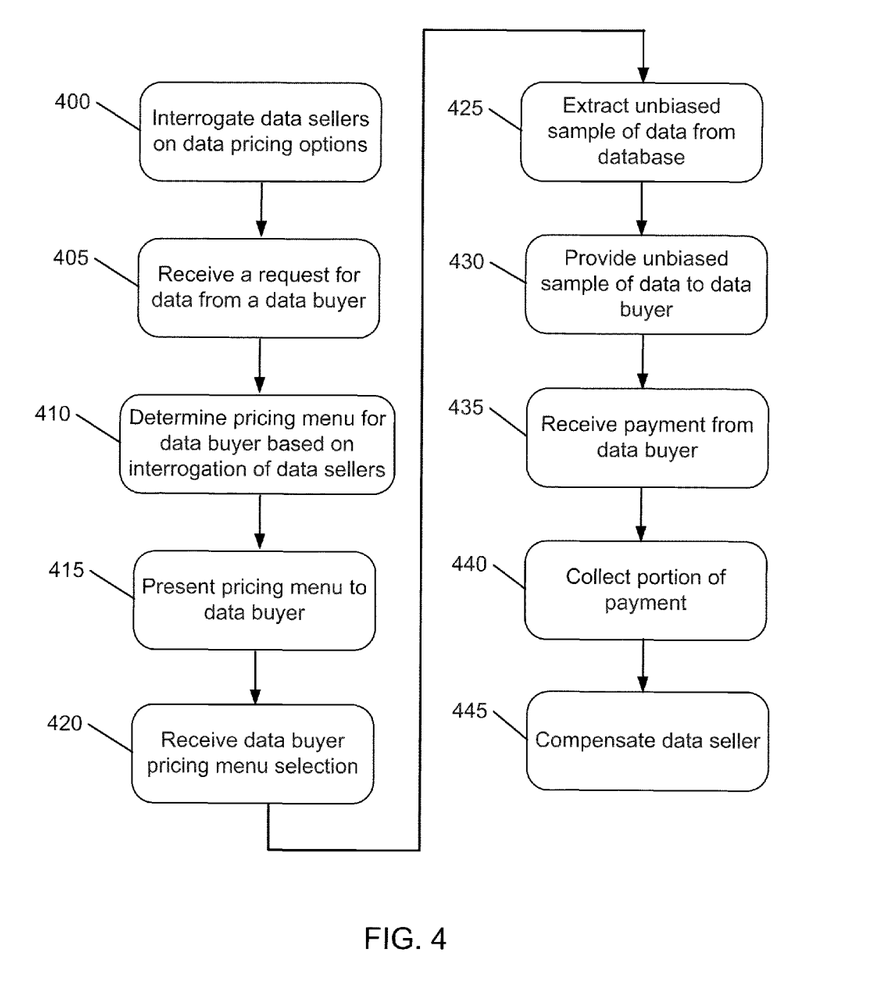
FIG. 4 illustrates additional details in a flowchart for a data market maker to manage a market for unbiased private individual data.

FIG. 4 illustrates additional details in a flowchart for a data market maker to manage a market for unbiased private individual data. First, the data market maker 205 interrogates the data sellers 215 on different pricing schemes for pricing their data (400). The data market maker 205 asks each data seller a series of questions. For each question, the data seller may select between different pricing schemes that allow a future data buyer access to the data sellers' private data. The data market maker 205 also gives the data sellers 215 a chance to opt out, that is, the data sellers 215 can choose not to participate in the market and sell their data. To minimize bias, the data market maker 205 offers prices that are high enough so that only a negligible fraction of data sellers 215 opt out. The data market maker 205 may present several iterations of this series of questions with different pricing schemes.

The data market maker 205 then receives (405) a request for an unbiased sample of private individual data from a data buyer 210 (e.g., data buyer 210a, data buyer 210b, . . . , and data buyer 210n) and determines a pricing menu for unbiased samples of private individual data based on the interrogation of the data sellers 215 (410). The pricing menu lists for each menu selection the total price that the data buyer 210 has to pay to get access to an unbiased sample of K data points from data sellers 215 for various values of K, e.g., it may cost $100 for K=100 and $250 for K=200.

Once the pricing menu is determined, the data market maker 205 presents it to the data buyer 210 (415). The data buyer 210 makes a selection of a sample size K and a corresponding price in the pricing menu, thus trading off accuracy and cost. A larger sample size K provides larger data points and more accurate results, but at the same time it costs more. The data market maker 205 receives the selection from the data buyer 210 (420) and proceeds to extract an unbiased sample of private individual data from databases 220 having the sample size K selected by the data buyer 210 (425). In exchange for providing the unbiased sample of private individual data to the data buyer 210 (430), the data market maker 205 receives a payment from the data buyer 210 (435). This payment corresponds to the price listed in the pricing menu for the sample size K selected by the data buyer 210. The data market maker 205 may collect a portion of the payment for itself (440). Lastly, the data market maker 205 compensates the data sellers 215 according to the pricing schemes they selected during their interrogation (345).

Figure 5:
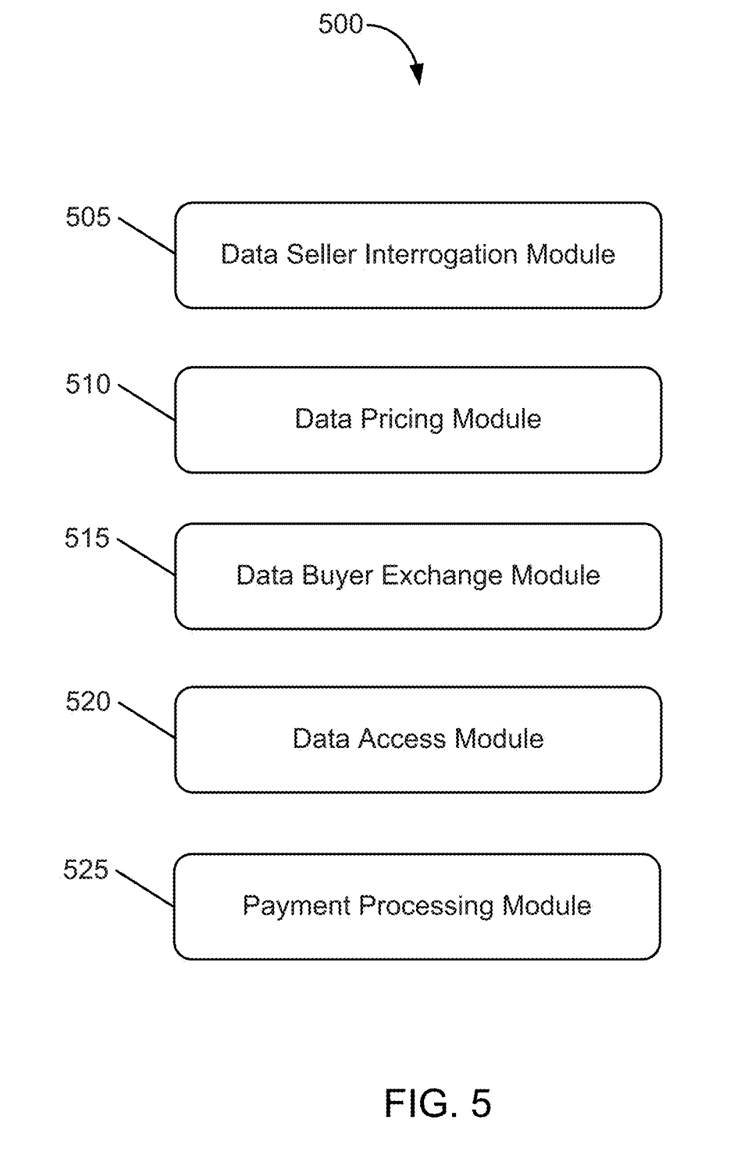
FIG. 5 illustrates modules implemented by a data market maker when managing a market for unbiased private individual data.

The steps illustrated in the flowchart of FIG. 4 may be implemented by the data market maker 205 with a series of modules. A module, as referred to herein, may be implemented in hardware, software, or a combination. FIG. 5 illustrates modules implemented by a data market maker when managing a market for unbiased private individual data. Modules 500 may include a Data Seller Interrogation Module 505, a Data Pricing Module 510, a Data Buyer Exchange Module 515, a Data Access Module 520, and a Payment Processing Module 525. The Data Seller Interrogation Module 505 generates the series of questions for allowing the data sellers 515 to select between different pricing schemes. The Data Seller Interrogation Module 505 aggregates all the choices from the data sellers and passes them along to the Data Pricing Module 510. The Data Pricing Module 510 generates pricing menus with different pricing options for the data buyers 210a-n. It is appreciated that a pricing menu is generated for each request from a data buyer 210.

The Data Buyer Exchange Module 515 presents the pricing menus to the data buyers 210a-n and receives menu selections from the data buyers 210a-n. As described above, each menu selection identifies a sample size and a price that each data buyer 210 has to pay for access to the data sample. The Data Access Module 520 extracts from databases 220 unbiased samples of private individual data of the sample size selected by the data buyers 210a-n. The unbiased samples of private individual data are randomly extracted from the set of all data that satisfies the data buyers' 210a-n request. The Payment Processing Module 525 collects payment from the data buyers 210a-n, processes a portion of the payment for the data market maker 205, and compensates the data sellers 215 for granting access to their data.

It is appreciated that multiple buyers may use the data of the same data seller 215. In this case, the data seller 215 may be paid each time that a data buyer 210 (e.g., data buyer 210a, data buyer 210b, . . . , and data buyer 210n) pays for access to the data seller's data. It is also appreciated that to get an accurate estimate of some statistic (e.g., some average), the data buyer 210 does not need to use the entire subset that he/she is interested in: a sample of an appropriate size usually suffices. In particular, let N be the number of individuals who satisfy the requirements of the data buyer's 210 request and let K be the size of an unbiased sample. If N is large, it is usually possible to obtain a good estimate even if K<<N, because of the Law of Large Numbers.

As described in more detail herein below, the goal of the data market maker 205 is to select the lowest price at which the data buyer 210 can get an unbiased sample. In this way, the data market maker 205 minimizes the amount of data that is traded. If the data market maker 205 sets a high price, a data seller 215 would be better off if his/her data was actually sold; however, a data buyer 210 would be less likely to buy. Thus, a high price could lead to market failure. The data market maker 205 solves this problem with an interrogation of data sellers 215 that identifies the privacy and risk attitudes of the data sellers 215. The data sellers 215 may be of two types: those that value their privacy and those that do not. The data sellers 215 that do not value their privacy as much would likely sell access to their data if paid any positive amount. In contrast, the data sellers 215 that value their privacy tend to require a high cost to grant access to their data.

For example, suppose that the data market maker 205 knows that a high cost data seller 215 (i.e., a data seller 215 that values his/her privacy and would sell his/her data only at a high cost) would be willing to sell access to his/her data if he/she is paid at least $10, whereas a low cost data seller 215 (i.e., a data seller 215 that does not value his/her privacy) would sell access to his/her data if paid any positive amount. If the data market maker 205 knew which data sellers 215 were low cost in advance and the data market maker 205 had the ability to price discriminate, the data market maker 205 would pay $10 to the high cost data sellers 215 and a very small positive amount to the low cost data sellers 215 in exchange for selling access to their data. But unfortunately for the data market maker 205 and the data buyers 210, this information on the data sellers 215 is not readily available.

One solution to this quandary is to pay $10 to every data seller 215 whose data a data buyer 210 purchases data access to. This would make both high cost and low cost data sellers 215 happy, but not the data buyer 210. Furthermore, a price of $10 per data point may be too high for the data buyer 210, resulting in a no-trade outcome. On the other hand, if the price was strictly smaller than $10, high cost data sellers 215 would not participate in the market 200 and the resulting data sample would be biased.

The goal is then to find a way by which the data buyer 210 pays strictly less than $10 on average per data point while getting an unbiased sample of data. This is possible if some individuals are risk averse and prefer a less risky lottery to a more risky one with the same expected payment. It is appreciated that some people exhibit risk averse behavior even for small payoffs, e.g., payments that are equal to a couple of dollars.

Figure 6A:
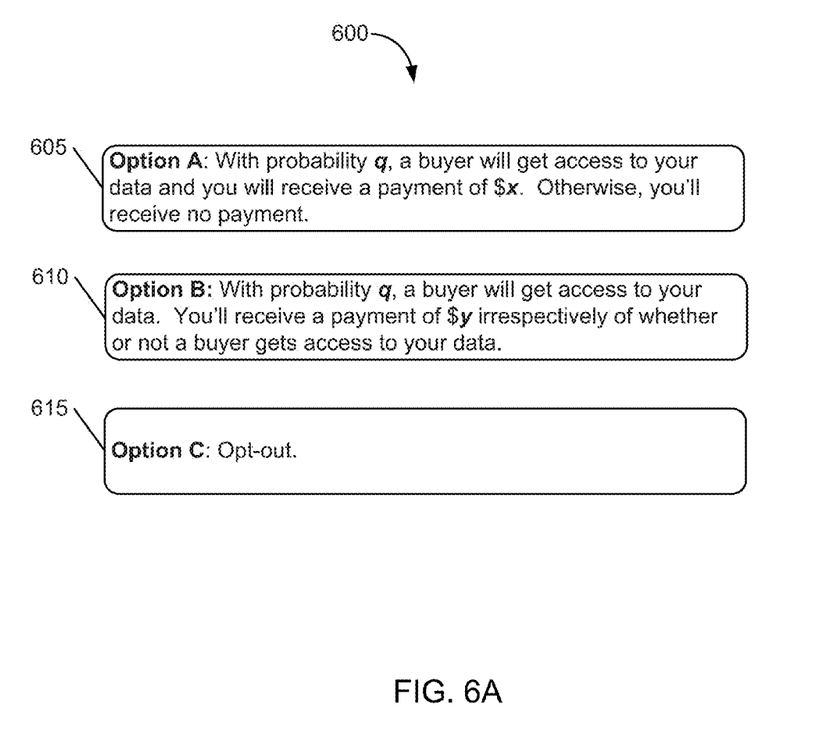
FIGS. 6A-B illustrate examples of pricing schemes presented to data sellers by a data market maker when collecting information on the privacy and risk attitudes of the data sellers.
Figure 6B:
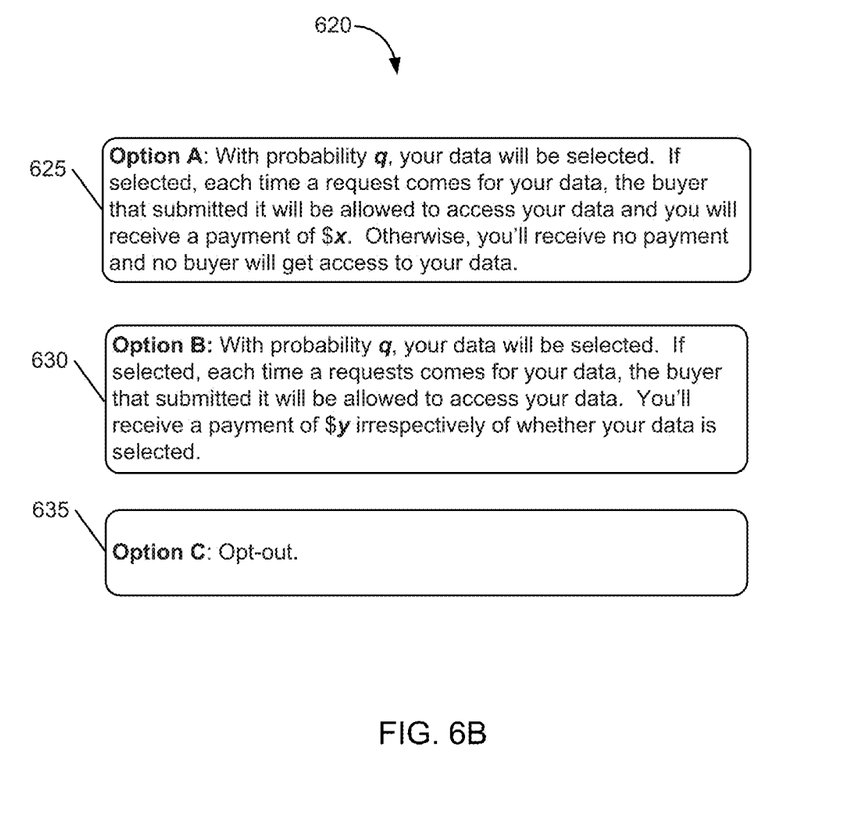

Attention is now directed to FIGS. 6A-B, which illustrate examples of pricing schemes presented to data sellers 215 by the data market maker 205 when collecting information on the privacy and risk attitudes of the data sellers 215. In FIG. 6A, the data market maker 205 asks data sellers 215 to select between different data pricing schemes 600 intended to capture the privacy and risk attitudes of the data sellers 215. Data pricing scheme 605 presents the following choice to data sellers 215: "with probability q, a buyer will get access to your data and you will receive a payment of $x. Otherwise, you will receive no payment." The data pricing scheme 610 presents the following choice to data sellers 215: "with probability q, a buyer will get access to your data. You'll receive a payment of $y irrespectively of whether or not a buyer gets access to your data." Data sellers 215 also have the choice to opt out of the market 200 by selecting option 615.

More generally, when asking data sellers 215 to select between potential pricing schemes, the data market maker 205 can vary: (1) the probability q at which a buyer gets access to ones' data; (2) the payment $x from pricing scheme 605; and (3) the payment $y from pricing scheme 610. With the goal of minimizing the payment of data buyer 210, the data market maker 205 is only interested in values for which the payment to an individual that selects pricing scheme 610 is strictly smaller than the expected payment to an individual that selects pricing scheme 605, that is, y<q.x, for various values of q, x, and y. For example, y could be $1, x could be $10, and q could be a 0.2 probability.

Pricing scheme 605 provides a high payment if a data buyer 210 gets access to one's data but provides no payment otherwise. Pricing scheme 610 provides a strictly lower positive payment irrespectively of whether a data buyer 210 gets access to one's data. When selecting values for x, the data market maker 205 can be informed by existing studies that assess how much an individual needs to be compensated to permit a decrease in pricing. To minimize bias, the data market maker 205 may set x high enough so only a negligible fraction of data sellers 215 opt out.

It is appreciated that given data pricing scheme 605 and data pricing scheme 610, no data seller 215 is better off by opting out by selecting option 615 if x is sufficiently high. Furthermore, it is appreciated that when a data seller 215 selects pricing scheme 610, the data seller 215 is paid even when his/her data is not used. It is also appreciated that high cost data sellers would most likely choose pricing scheme 605. In particular, with pricing scheme 605, a high cost data seller 215 is fully compensated whenever his/her data is accessed by a data buyer 210. On the other hand, by choosing pricing scheme 610, a high cost data seller 215 incurs a significant loss when his/her data is used and only receives a small payment. This cost generally outweighs the benefit of getting $y from pricing scheme 610 when his/her data is not used.

The choice of a low cost data seller 215 depends on his/her attitude: a data seller 215 would select pricing scheme 605 if he/she were risk seeking or risk neutral, but would select pricing scheme 610 if he/she were sufficiently risk averse. Notice that, in expectation, the payment to someone that selects pricing scheme 605 is higher than the payment to someone that selects pricing scheme 610, and that some data sellers may select data pricing scheme 610 because of risk aversion.

As an example, suppose that a data buyer 210 is interested in using a sample of data from data sellers 215 with certain characteristics (e.g., in terms of demographics). Suppose that there are N=1000 such data sellers and the data buyer 210 wants to use a sample of size K=200. Suppose also that x=$10, and y=$1. The data market maker 205 can select a random sample of size K from the population of N and ask the data buyer 210 to pay each data seller 215 according to their choices. Note that each data seller 215 is selected with probability q=K/N=0.2. If half of the data sellers 215 have selected pricing scheme 610, the total expected payment to the data buyer 210 is 100×10+500×1=1,500, or equivalently $7.5 per data point. On the other hand, if every data seller is paid $10 when his/her data is used, the total expected payment would be 200×10=2,000, that is, $10 per data point.

Each data seller 215 is presented several iterations of data pricing schemes 600 with different values of q, x, and y. As described in more detail herein below, by aggregating the choices of all data sellers 215, the data market maker 205 is then able to derive pricing menus which can be used to sell data to data buyers 210a-n. Notice that during the first iterations of market making there will limited information as to what the ongoing x and y prices for the majority of data sellers 215 are when opting to sell access to their private data. As the market 200 matures, creating a pricing menu may require fewer but more accurate (in the sense of the values of $x and $y) iterations of data pricing schemes for the data sellers 215.

As discussed above, by presenting appropriate pricing schemes 600 to the data sellers 215, the data market maker 205 can discover what pricing scheme each data seller 215 prefers for selling access to his/her data to a data buyer 210. More generally, multiple data buyers 210 may pay to access the data of a single data seller 215. The data market maker 205 can facilitate such trade by varying the wording in pricing schemes 605 and 610 to reflect that multiple sales may occur. FIG. 6B presents this alternate wording.

For example, data pricing scheme 625 presents the following choice to data sellers 215: "with probability q, your data will be selected. If selected, each time a request comes for your data, the buyer that submitted it will be allowed to access your data and you will receive a payment of $x. Otherwise, you'll receive no payment and no buyer will get access to your data." The data pricing scheme 630 presents the following choice to data sellers 215: "with probability q, your data will be selected. If selected, each time a requests comes for your data, the buyer that submitted it will be allowed to access your data. You'll receive a payment of $y irrespectively of whether your data is selected." Data sellers 215 again have the choice to opt out of the market 200 by selecting option 635.

It is appreciated that a risk averse data seller 215 is more likely to choose pricing scheme 630 (as compared to pricing scheme 625) when he/she expects that a larger number of data buyers 210 would be interested in the data seller's 215 data. As a result, the data market maker 205 may be able to further reduce the expected payment of a single data buyer if there is a large number of data buyers 210a-n.

It is also appreciated that even though this approach is based on the assumption that multiple data buyers 210a-n may be interested in the same subset of data sellers 215, it is possible to generalize for the case that data buyers 210a-n are interested in different subsets which overlap. Then, the data market maker 205 may face a trade-off between (1) taking advantage of risk aversion as much as possible to minimize each data buyer's 210 expected payment and (2) asking sellers simple questions (in terms of the pricing schemes they prefer) that accurately reflect how the data market maker 205 assigns data sellers 215 to data buyers 210a-n.

Additionally, it is appreciated that data sellers 215 may be able to have a say on what their data are to be used for. The data market maker 205 can provide information about the range of applications that data buyers may be interested in (e.g., biomedical, educational, social studies, marketing, etc.). Then, by opting in, a data seller 215 accepts that his/her data can be used for any of these applications by any buyer. Alternatively, there could be multiple pricing menus that dictate different usage policies; this approach would provide more transparency but would result in a more complex experience for the data sellers 215.

Further, it is appreciated that data pricing schemes 600 and 620 are provided for purposes of illustration only. Alternative and or/ additional data pricing schemes may be used by the data market maker 205 to inquire data sellers 215 on their privacy and risk attitudes. For example, the data market maker 205 is not limited to using two pricing schemes (e.g., pricing schemes 605 and 610) and an opt out option (e.g., opt out option 615) to learn of the data sellers' 215 privacy and risk attitudes. The data market maker 205 may instead have a series of pricing schemes (i.e., more than two) for the data sellers 215 to select.

Figure 7:
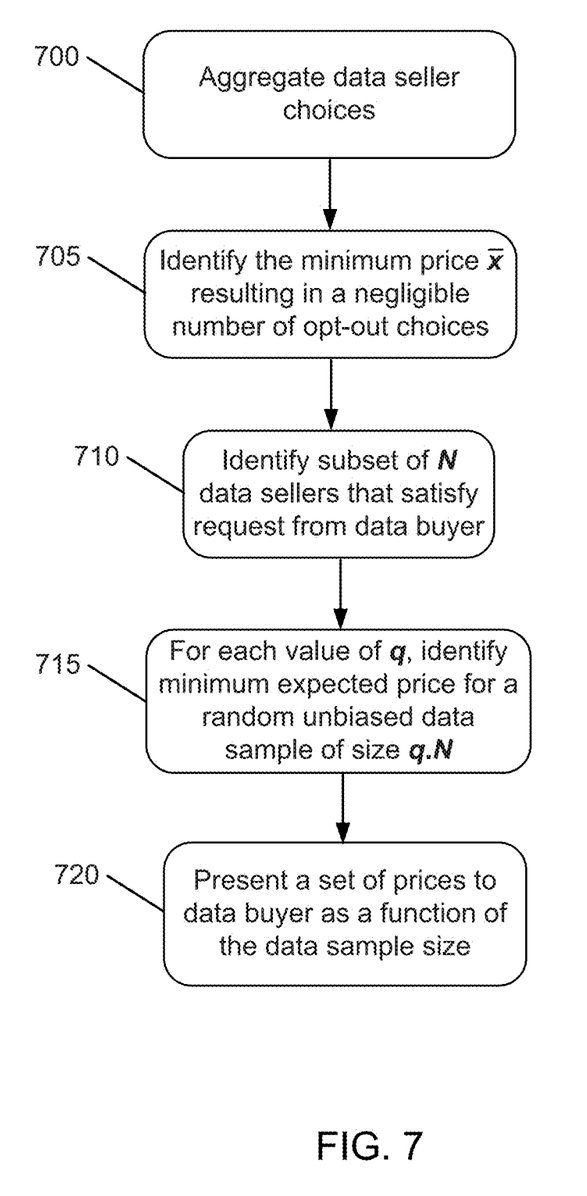
FIG. 7 illustrates a flowchart for determining a pricing menu for data buyers.

Referring now to FIG. 7, a flowchart for determining a pricing menu for data buyers is described. First, the data market maker 205 aggregates all the data seller choices when selecting the pricing schemes in FIGS. 6A-B (700). The data market maker 205 then analyzes the choices selected by the data sellers 215 to identify the minimum price that results in a negligible number of data sellers 215 selecting to opt-out (705). When a request from a data buyer 210 arrives, the data market maker 205 first identifies the subset of data sellers 215 that the data buyer 210 is interested in (710). Suppose that this subset consists of N data sellers 215. Then, using the choices of these N data sellers 215 between pricing schemes 605 and 610 (and/or pricing schemes 625 and 630) for the questions with x=$\bar{x}$ for each probability q, the data market maker 205 identifies the minimum expected price for which the data buyer 210 can get access to a random unbiased sample of data of size q.N (715).

In particular, for a fixed q: as $y increases, the number of data sellers 215 that selects options 610 and 630 increases, but at the same time the expected payment to each such data seller 215 also increases. For each probability q, the data market maker 205 chooses the value of $y that minimizes the expected amount that the data buyer 210 has to pay per data point. By doing this for every value of q for which the data market maker 205 has the choice of data sellers 215, the data market maker 205 derives the pricing menu. The pricing menu is presented to the data buyer 210 as a function of the sample size, i.e., the number of data points in the unbiased sample (720).

Figure 8:
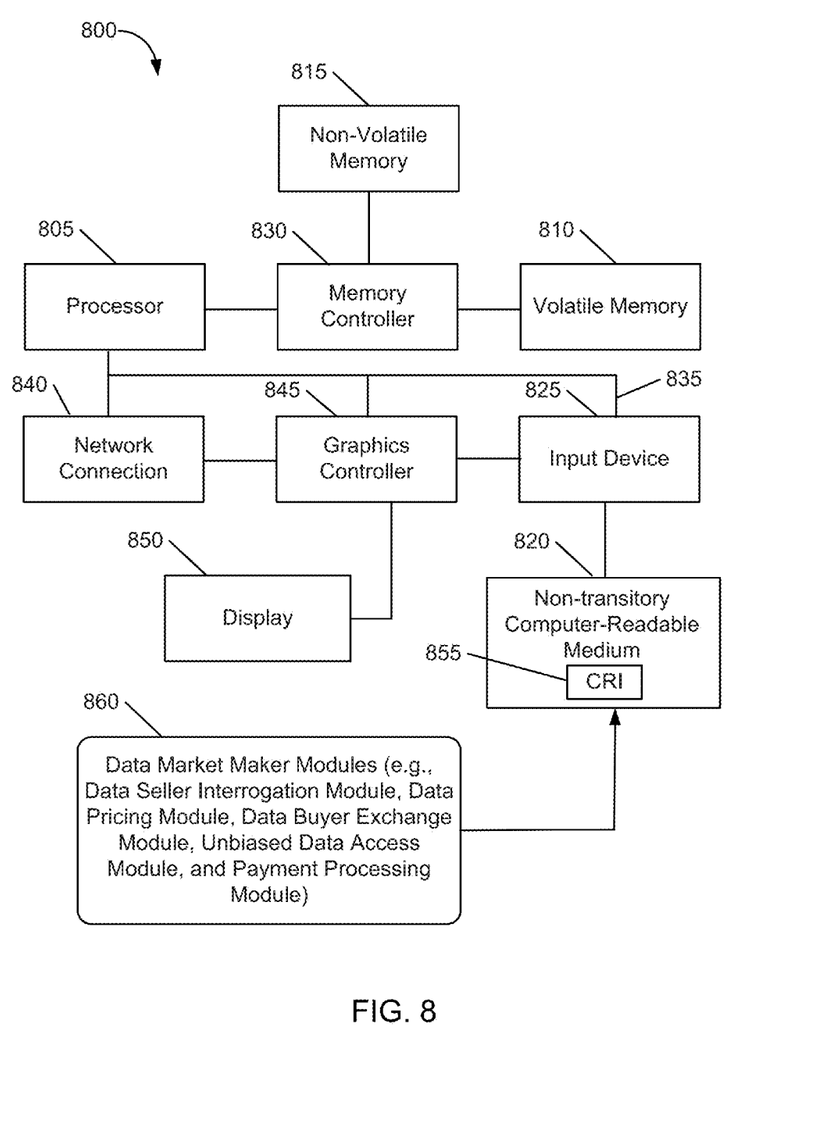
FIG. 8 illustrates a block diagram of an example computing system for hosting the modules of FIG. 5 according to various examples.

As described above, the modules used by the data market maker to provide a market for unbiased private data may be implemented in hardware, software, or a combination of both. Referring now to FIG. 8, a block diagram of an example computing system for hosting the modules of FIG. 5 according to various examples of the present disclosure is described. The computing system 800 (e.g., a desktop computer, a laptop, a multi-core processing system, a tablet, a smart phone, a mobile device, a gaming system, etc.) can include a processor 805 and memory resources, such as, for example, the volatile memory 810 and/or the non-volatile memory 815, for executing instructions stored in a tangible non-transitory medium (e.g., volatile memory 810, non-volatile memory 815, and/or computer readable medium 820) and/or an application specific integrated circuit ("ASIC") including logic configured to perform various examples of the present disclosure.

A machine (e.g., a computing device) can include and/or receive a tangible non-transitory computer-readable medium 820 storing a set of computer-readable instructions (e.g., software) via an input device 825. As used herein, the processor 805 can include one or a plurality of processors such as in a parallel processing system. The memory can include memory addressable by the processor 805 for execution of computer readable instructions. The non-transitory computer readable medium 820 can include volatile and/or non-volatile memory such as a random access memory ("RAM"), magnetic memory such as a hard disk floppy disk, and/or tape memory, a solid state drive ("SSD"), flash memory, phase change memory, and so on. In some examples, the non-volatile memory 815 can be a local or remote database including a plurality of physical non-volatile memory devices.

The processor 805 can control the overall operation of the computing system 800. The processor 805 can be connected to a memory controller 830, which can read and/or write data from and/or to volatile memory 810 (e.g., RAM). The memory controller 830 can include an ASIC and/or a processor with its own memory resources (e.g., volatile and/or non-volatile memory). The volatile memory 810 can include one or a plurality of memory modules (e.g., chips). The processor 805 can be connected to a bus 835 to provide communication between the processor 805, the network connection 840, and other portions of the computing system 800. The non-volatile memory 815 can provide persistent data storage for the computing system 800. Further, the graphics controller 845 can connect to a display 850.

Each computing system 800 can execute computer-readable instructions that are stored on a non-transitory computer-readable medium 820. The non-transitory computer-readable medium 820 can be integral, or communicatively coupled, to computing device 800, in either a wired or wireless manner. For example, the non-transitory computer-readable medium 820 can be an internal memory, a portable memory, a portable disk, or a memory located internal to another computing resource (e.g., enabling the computer-readable instructions to be downloaded over the Internet).

The non-transitory computer-readable medium 820 can have computer-readable instructions 855 stored thereon that are executed by the processor 805 to implement data market maker modules 500 (e.g., Data Seller Interrogation Module 505, Data Pricing Module 510, Data Buyer Exchange Module 515, Data Access Module 520, and Payment Processing Module 525) according to the present disclosure. The non-transitory computer-readable medium 820, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 820 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

Advantageously, the methods and modules presented herein enable a realistic and feasible market for unbiased samples of private data that compensates those individuals that opt to participate in the market according to their own privacy and risk attitudes. This is in contrast to other market approaches to privacy that would result in the acquisition of either cheap and biased data or unbiased data sets that are large and costly. The market proposed herein can be used for applications that run the gamut from biomedical to social and educational applications. In addition, the market takes into account the fact that in real life a significant fraction of individuals exhibit risk averse behavior to construct a pricing menu for data buyers that reflects the privacy and risk attitudes of the data sellers and benefits the data buyers.

It is appreciated that the previous description of the disclosed examples is provided to enable any person skilled in the art to make or use the present disclosure. Various modifications to these examples may be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciated that the present disclosure is not limited to a particular computing system configuration, such as computing system 1000.

Those of skill in the art further appreciate that the various illustrative modules and steps described in connection with the examples disclosed herein may be implemented as electronic hardware, computer software, or combinations of both. For example, the example steps of FIGS. 3, 4, and 7 may be implemented using software modules, hardware modules or components, or a combination of software and hardware modules or components. Thus, in one example, one or more of the example steps of FIGS. 3, 4, and 7 may comprise hardware modules or components. In another example, one or more of the steps of FIGS. 3, 4, and 7 may comprise software code stored on a computer readable storage medium, which is executable by a processor.

To clearly illustrate this interchangeability of hardware and software, various illustrative components, blocks, modules, and steps have been described above generally in terms of their functionality (e.g., Data Seller Interrogation Module 505, Data Pricing Module 510, Data Buyer Exchange Module 515, Data Access Module 520, and Payment Processing Module 525). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A computer-implemented method for creating a market for private individual data, comprising:
   requesting information from owners of private individual data on their privacy and risk attitudes;
   receiving a request for access to private individual data from a data buyer, the private individual data stored in a database;
   determining, by a computer, a pricing menu listing prices and data sample sizes for the data buyer to pay for access to the private individual data based on the requested information; and
   extracting, by the computer, a data sample of the private individual data from the database, the sample having a data sample size selected by the data buyer from the pricing menu.

2. The computer-implemented method of claim 1, wherein requesting information from owners of private individual data on their privacy and risk attitudes comprises asking the owners of the private individual data to select between different pricing schemes listing a set of prices and data sample sizes.

3. The computer-implemented method of claim 1, wherein requesting information comprises allowing the owners of private individual data to opt out of the market and not sell their private individual data.

4. The computer-implemented method of claim 2, wherein the different pricing schemes comprise a first pricing scheme for owners of private individual data that are willing to sell access to their private individual data for a high expected cost that is tied to how much they value their privacy.

5. The computer-implemented method of claim 2, wherein the different pricing schemes comprise a second pricing scheme for owners of private individual data that are willing to sell access to their private individual data for a low expected cost that is tied to how little they value their privacy.

6. The computer-implemented method of claim 4, wherein the first pricing scheme pays owners of private individual data a price anytime the data buyer gets access to their data.

7. The computer-implemented method of claim 5, wherein the second pricing scheme pays owners of private individual data a price irrespectively of whether or not the data buyer gets access to their data.

8. The computer-implemented method of claim 2, wherein determining a pricing menu listing prices for the data buyer to pay for access to the private individual data based on the collected information comprises aggregating all choices made by the owners of the private individual data when selecting between different pricing schemes.

9. The computer-implemented method of claim 8, wherein determining a pricing menu comprises analyzing the aggregated choices to identify a minimum expected price for a random unbiased sample of private individual data.

10. The computer-implemented method of claim 1, comprising compensating the owners of the private individual data for access to their data.

11. A system for a data market maker to create a market for private individual data, comprising:
    a processor; and
    a set of memory resources storing a set of modules with routines executed by the processor, the set of modules comprising:
       a data seller interrogation module to request information from owners of private individual data on their privacy and risk attitudes;
       a data pricing module to determine a pricing menu based on answers to the request for information from the owners of the private individual data;
       a data buyer exchange module to receive a request for private individual data and a selection on the pricing menu from a data buyer, the selection corresponding to a data sample of private individual data and a price for the data sample;
       a data access module to extract the sample of private individual data from one or more databases, the sample having a data sample size selected by the data buyer from the pricing menu; and
       a payment processing module to receive payment from the data buyer and compensate the owners of the sample of private individual data.

12. The system of claim 11, wherein the data pricing schemes comprise a first pricing scheme for owners of private individual data that are willing to sell access to their private individual data for a high expected cost that is tied to how much they value their privacy.

13. The system of claim 11, wherein the data pricing schemes comprise a second pricing scheme for owners of private individual data that are willing to sell access to their private individual data for a low cost that is tied to how little they value their privacy.

14. The system of claim 11, wherein the data seller interrogation module comprises executable routines to generate an option for the owners of private individual data to opt out of the market and not sell their data.

15. The system of claim 11, wherein the data pricing module comprises executable routines to analyze selections on the different pricing schemes by the owners of private individual data and to identify a minimum expected price for a random unbiased sample of private individual data based on the selections.

16. The system of claim 11, wherein the payment processing module comprises executable routines to collect a portion of the payment from the data buyer to compensate the data market maker.

17. A non-transitory computer-readable medium comprising executable instructions to:
    request information from owners of private individual data by providing them a set of data pricing options, the data pricing options to capture privacy and risk attitudes of the owners of private individual data;
    aggregate selections of the set of data pricing options from the owners of the private individual data;
    determine a pricing menu listing a set of prices for a set of samples of private individual data based on the selections;
    receive a selection for a price and sample of private individual data from a data buyer;
    extract a sample of private individual data from one or more databases, the data sample having a data sample size selected by the data buyer from the pricing menu;
    provide the sample of private individual data to the data buyer; and
    process payment from the data buyer and to owners of the selected sample of private individual data.

18. The non-transitory computer readable medium of claim 17, wherein the set of data pricing options comprises an option for owners of private individual data to opt out from selling their data.

19. The non-transitory computer readable medium of claim 17, wherein to determine a set of prices for a set of samples of private individual data based on the selections comprises to determine a minimum expected price for the samples of private individual data based on the aggregated selections from the owners of the private individual data.

20. The non-transitory computer readable medium of claim 17, comprising executable instructions to collect a portion of the payment from the data buyer to compensate the data market maker.

* * * * *